March 15, 1927. Re. 16,574
F. V. RISINGER
BURNER
Original Filed March 31, 1923
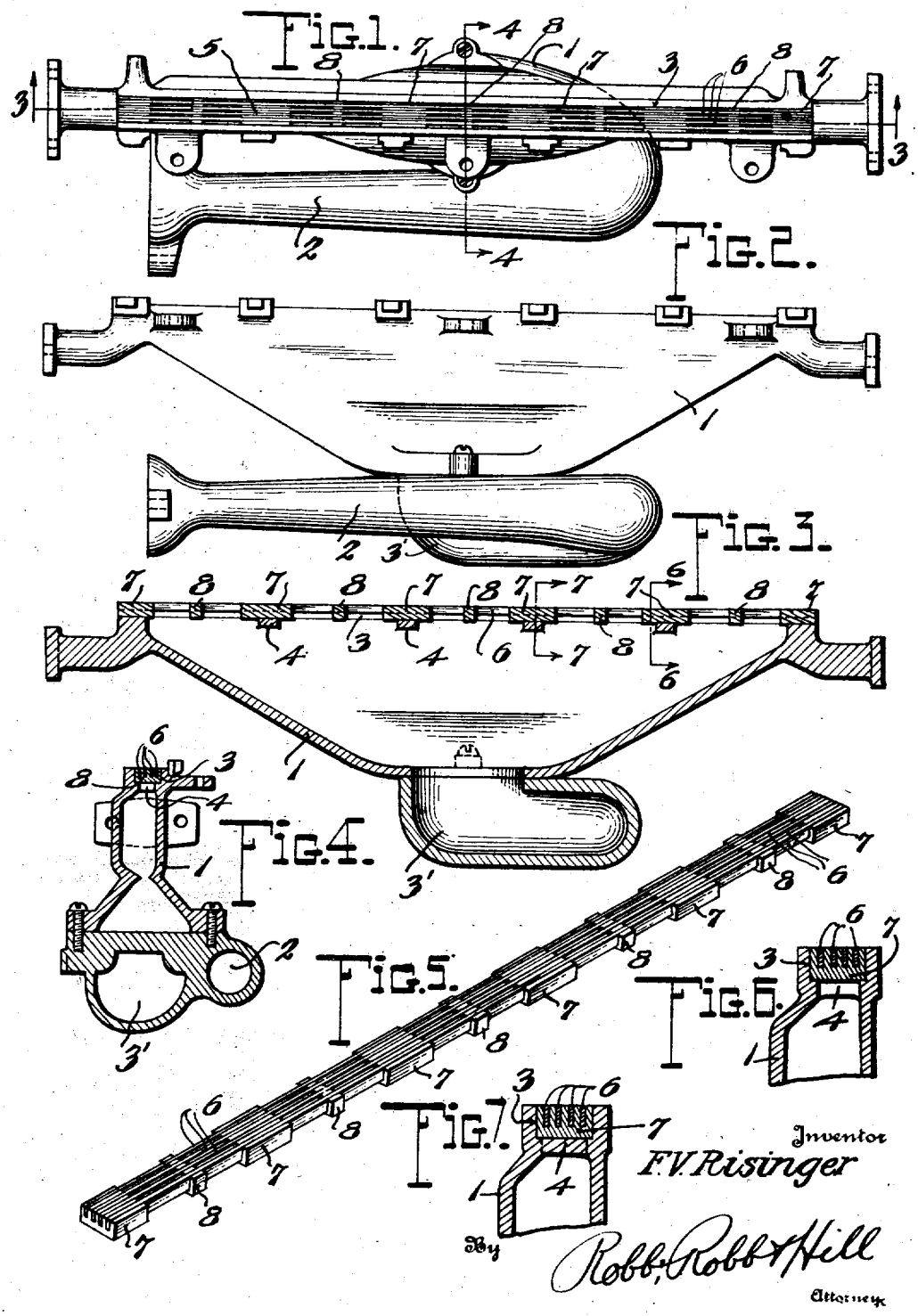

Reissued Mar. 15, 1927. Re. 16,574

UNITED STATES PATENT OFFICE.

FRANK V. RISINGER, OF LAKEWOOD, OHIO.

BURNER.

Original No. 1,519,056, dated December 9, 1924, Serial No. 629,193, filed March 31, 1923. Application for reissue filed December 2, 1926. Serial No. 152,242.

This invention relates to improvements in gas burners, and more particularly to burners adapted for use in connection with the radiant stoves, an object of the invention being to provide an improved construction of grid with an improved mounting therefor, whereby the maximum of efficiency may be had in fuel consumption, and which enables the grid to be readily removed and cleaned from time to time.

A further object is to provide an improved burner construction in which the gas is properly fed through all of the spaces of the grid so that the heat units are utilized to the full and best results are had in giving fuel consumption and radiance in the stove in which the burner is used.

A further object is to provide a burner with a gas manifold in which a relatively long narrow channel having parallel sides and spacers connecting the base of the channel for supporting a removable grid which fits the channel, and which comprises longitudinal strips held in spaced relation by blocks fixedly secured thereto and functioning as supports or rests for the grid upon the spacers.

With these and other objects in view, the invention consists in certain novel features of construction and combinations, and arrangement of parts, as will be more fully hereinafter described and pointed out in the claims.

In the accompanying drawings:

Figure 1 is a plan view illustrating my improved burner.

Figure 2 is a view in side elevation.

Figure 3 is a view in longitudinal section on the line 3—3, of Figure 1.

Figure 4 is a view in transverse section on the line 4—4, of Figure 1.

Figure 5 is a perspective view of the grid.

Figure 6 is a fragmentary view in transverse section on the line 6—6 of Figure 3.

Figure 7 is a similar view in section on the line 7—7 of Figure 3.

1 represents the manifold or burner body of my improved burner which is elongated longitudinally and at its lower reduced portion is removably secured to the outlet end of a Bunsen tube 2.

This Bunsen tube at its point of connection with the manifold 1 is curved to give the necessary length to the Bunsen tube and to provide a chamber 3′ in which the gas is permitted a swirling action before its entrance into the manifold 1, so that it is evenly distributed throughout the manifold 1 for best results.

The upper edge of the manifold 1 is formed with a longitudinal channel 3, which channel may be cut by an ordinary tool in straight line with parallel side walls, and integral spacers 4 connect the walls of the channel and provide supports for my improved grid 5.

The grid 5 consists of a plurality of longitudinal strips 6 which are held in spaced relation by grid blocks 7 and 8. These blocks 7 and 8 are recessed in their upper faces to receive the strips 6 which are secured in the recesses in any approved manner, and the blocks 7 are relatively long as compared to the blocks 8, and are adapted to rest upon the spacers 4 as well as upon the end walls of the burner. It is essential that the form of the grid means which are used be such that the spaces between the grid elements or strips shall be much deeper than the width of said spaces, in order to obtain efficient operation of my burner for its use in radiant stoves.

It is to be understood that these blocks 7 and 8 are of a width corresponding to the width of the channel so that they fit neatly and snugly within the channel of the burner and provide longitudinal burner orifices between the spacers 4.

By reason of a construction of this character, the grid can be readily removed and cleaned from time to time and furthermore a maximum of efficiency in fuel consumption is secured because the gas with its contents of air is uniformly distributed to the spaces or orifices formed between the strips and burns with a full heating and intense flame, which is especially adapted for use in connection with radiant stoves and the like.

Various slight changes might be made in the general form and arrangement of parts without departing from my invention, and hence I do not limit myself to the precise details set forth, but consider myself at liberty to make such changes and alterations as fairly fall within the spirit and scope of the appended claims.

I claim:

1. As a new article of manufacture, a grid for gas burners, comprising longitudinal spaced strips, and blocks maintaining the strips in spaced relationship, said blocks having longitudinal recesses in their upper faces receiving the strips, the alternate blocks being of the same length with the adjacent blocks of different lengths.

2. A burner of the character described, comprising an elongated flared manifold having a longitudinal open-ended channel in its upper face, and a removable grid fitting said channel and comprising the longitudinal strips and blocks fixed to the strips.

3. A burner of the character described, comprising an elongated flared manifold having a longitudinal channel in its upper face, and a removable grid fitting said channel and comprising longitudinal strips and blocks fixed to the strips, and integral spacers across the base of the channel and supporting certain of the blocks of the grid whereby the burner is divided into a plurality of burner orifices.

4. A burner of the class described comprising a gas chamber, one wall of said chamber having grid supporting means forming a longitudinal open-ended channel in communication with said chamber, and a grid mounted in said channel, whereby the grid is free to expand or contract longitudinally of the channel.

5. A burner of the character described comprising an elongated manifold forming a gas chamber and having at its top grid supporting means forming a longitudinal open-ended channel communicating with the chamber, said manifold being formed with spaced supports extending transversely across the channel and at the base thereof, and a removable grid mounted in said channel and sustained by said supports, said grid comprising a series of spaced bars free to expand or contract longitudinally of the channel.

FRANK V. RISINGER.